Feb. 12, 1929.

C. MORGANA ET AL 1,702,127

UPHOLSTERY BUTTON ASSEMBLY

Filed Oct. 17, 1927

Inventors
Charles Morgana
George A. Miller
Nicholas M. Willet

By Whittemore Hulbert Whittemore Belknap
Attorneys

Patented Feb. 12, 1929.

1,702,127

UNITED STATES PATENT OFFICE.

CHARLES MORGANA, GEORGE A. MILLER, AND NICHOLAS M. WILLET, OF DETROIT, MICHIGAN, ASSIGNORS TO BRIGGS MANUFACTURING COMPANY, OF DETROIT, MICHIGAN, A CORPORATION OF MICHIGAN.

UPHOLSTERY-BUTTON ASSEMBLY.

Application filed October 17, 1927. Serial No. 226,697.

This invention relates generally to upholstery button assemblies and consists of certain novel features of construction, combinations and arrangements of parts as will be hereinafter more fully described and particularly pointed out in the appended claims.

Heretofore, twine, cord and the like have been used to attach buttons to unholstery units, for example, of automobile seats and seat bodies. Usually such cord or twine is first threaded through the eye of such button and after being drawn by suitable needles through the upholstery unit, is tied or otherwise secured to the spring structure upon which the upholstery unit is mounted. Ordinarily such attaching operations are performed by hand and being tedious require a great deal of time and labor. Moreover, the cord or twine frequently works loose or breaks when the seat is used, and therefore such a method of attaching buttons to upholstery is quite objectionable.

With the present invention, the objectionable features just set forth have been overcome and the buttons are attached to the spring structure by means of light spring metal clips. which are permanently connected to the eyes of the buttons as sub-assemblies before being applied to the upholstery unit and which, due to their construction, may be easily, quickly and permanently attached to the spring structure of the seat. Thus the likelihood of buttons becoming lost or separated from the upholstery unit has been obviated. Moreover, attachment of the buttons to the spring structure may be effected by suitable tools designed for this purpose with a material saving in time and labor.

In the accompanying drawing Figure 1 is a fragmentary vertical longitudinal sectional view through a seat with a button assembly embodying my invention;

Figure 1:
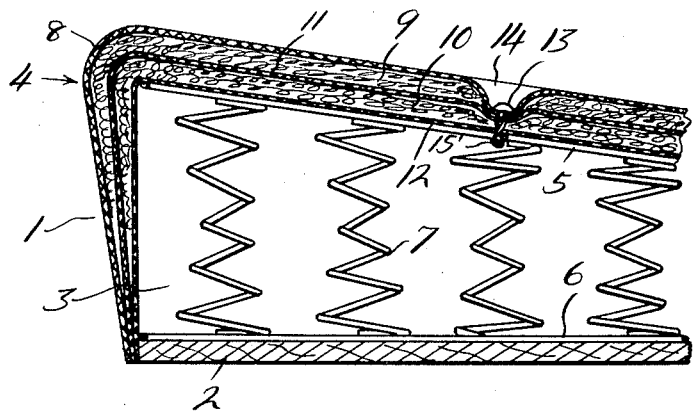
Figure 2:
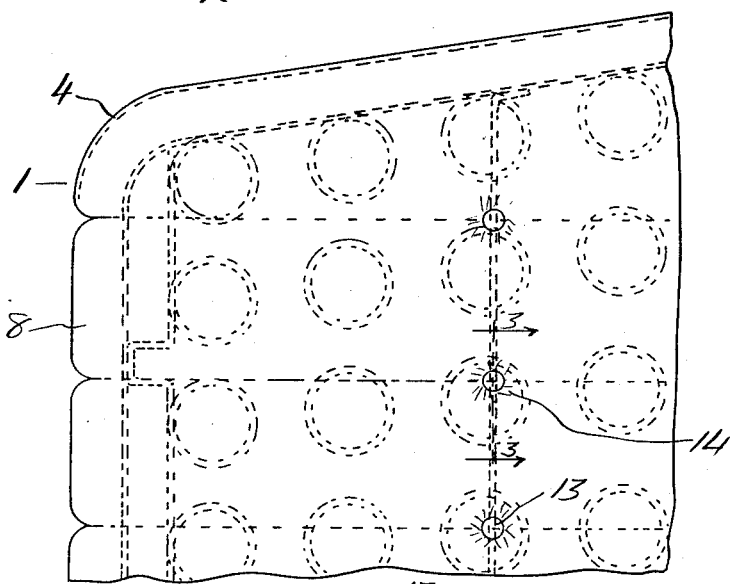
Figure 2 is a fragmentary top plan view of the construction shown in Figure 1.
Figure 3:
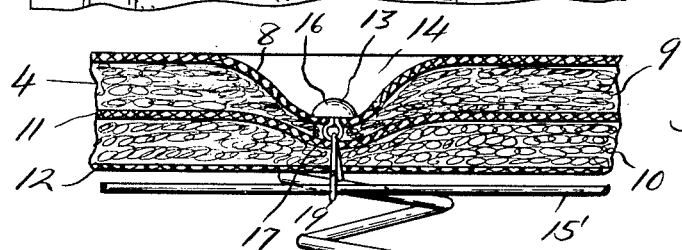
Figure 3 is an enlarged fragmentary vertical sectional view taken on the line 3—3 of Figure 2.
Figure 4:
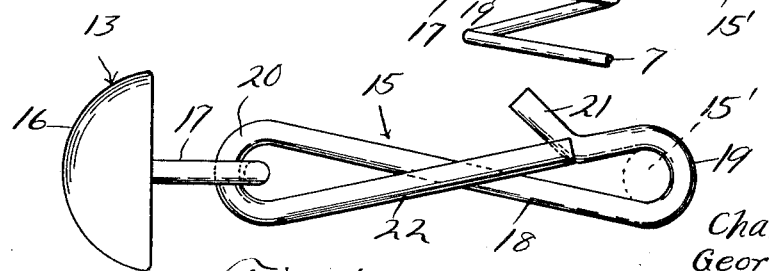
Figure 4 is a detailed view of a clip and button.

Referring now to the drawing, 1 is a seat, preferably of an automobile having a base 2, spring structure 3, and upholstery unit 4. As shown, the base 2 is preferably of conventional form and serves as a support in the usual way for the spring structure 3, which in turn has the upper and lower wire frames 5 and 6 respectively, and the intermediate coils 7, and serves as a yieldable support for the upholstery unit 4. Preferably this unit comprises an outer plush covering 8, and two layers 9 and 10 respectively of wadding, each layer having a burlap base 11 and 12 respectively.

With the present invention, buttons 13 are located in depressions 14 in the plush covering 8 of the upholstery unit and are held in place by means of metal clips 15 which are fastened to suitable spaced anchorage wires 15' extending across but within and terminally secured to the spring structure 3 of the seat. As shown, each button 13 is of conventional form and has an upholstered body 16 and a depending eye 17, while each clip is preferably formed of a length of wire and comprises a short, straight body 18 provided at one end with an open return bent portion 19 and provided at its upper end with a closed bent return portion 20. As shown, the open return bent portion 19 co-operates with the body 18 to form a hook and preferably terminates in an inwardly inclined outwardly extending curved lip portion 21 for facilitating the reception of the anchorage wire 15' into the hooked portion of the clip. The return bent portion 20 preferably has an extension 22 that crosses the body 18 intermediate of its ends at substantially an acute angle thereto and terminates at one side of but near to the lip 21 so as to normally close the throat of the open return bent portion 19 of the hook.

As spring metal wire is used in the construction of the clip and as the extension 22 freely crosses the body 18, it will be apparent that the extension is free to spring inwardly to permit the reception of the anchorage wire 15 into the open return bent portion 19 when the clip is applied to the anchorage wire, but will spring back to normal position immediately after such wire is free of the extension and in the said open return bent portion 19. Hence this extension 22 serves as a retainer or guard for the clip to prevent accidental disengagement of the clip from its anchorage wire. Moreover, as the parts 15 and 15' are within the said spring structure 3 and therefore not ordinarily accessible, and as accidental disengagement of the clip from the wire 15' is not likely, the connections between such parts are practically of a permanent nature. Any suitable tool such as shown in a companion application may be used to insert the clip 15 through the upholstery unit 4 into operative engagement with the anchorage wire 15.

While it is believed that from the foregoing description, the nature and advantage of our invention will be readily apparent, we desire to have it understood that we do not limit ourselves to what is herein shown and described and that such changes may be resorted to when desired as fall within the scope of what is claimed.

What we claim as our invention is:

1. In an upholstery button assembly, the combination with a spring structure, and an upholstery unit therefor, of a button on said unit and having an eye in said unit, and attaching means for the button including a metallic connection between said eye and spring structure.

2. In an assembly of the class described, the combination with an upholstery unit, and a support therefor, of a button on the upholstery unit, and securing means for said button including a metal part extending transversely of said unit and terminally connected to said button and support.

3. In an assembly of the class described, the combination with an upholstery unit, and a support therefor, of a button on said unit having an eye in said unit, and attaching means for the button including a metallic clip having a closed portion connected to the eye of the button and having another portion connected to said support.

4. In an upholstery button assembly, the combination with a spring structure, an upholstery unit therefor, of a button on the exposed face of said unit, attaching means for the button including a metallic clip terminally connected to said button and spring structure.

5. In an assembly of the class described, the combination with a spring structure, an unholstery unit therefor, of a button on the exposed face of said unit and having an eye, a wire carried by said spring structure, attaching means for the button including a clip having a closed portion connected to the eye of the button and having a hooked portion connected to the wire aforesaid.

6. In an assembly of the class described, the combination with a spring structure, an upholstery unit therefor, of a button on the exposed face of said unit and having an eye, a wire carried by said spring structure, attaching means for the button including a clip having a closed portion connected to the eye of the button and having a hooked portion connected to the wire aforesaid, said closed portion having an extension normally closing the throat of the hook for preventing accidental disengagement of the hook from said wire.

7. In an assembly of the class described, the combination with an upholstery unit, and a support therefor, of a button on the upholstery unit, and securing means for said button including a metallic clip extending transversely of said unit and permanently carried by the button, said clip being detachably connected to said support.

8. In an assembly of the class described, the combination with an upholstery unit, and a support therefor, of a button on said unit having an eye in said unit, and attaching means for the button including a metallic clip having a closed portion permanently connected to the eye of the button and having a hooked portion detachably connected to said support.

In testimony whereof they affix their signatures.

CHARLES MORGANA.
GEORGE A. MILLER.
NICHOLAS M. WILLET.